United States Patent
Camacho Perez et al.

(10) Patent No.: US 10,324,494 B2
(45) Date of Patent: Jun. 18, 2019

(54) APPARATUS FOR DETECTING ELECTROMAGNETIC FIELD CHANGE IN RESPONSE TO GESTURE

(71) Applicant: Intel Corporation, Santa Clara, CA (US)

(72) Inventors: Jose Rodrigo Camacho Perez, Guadalajara Jalisco (MX); Carlos Alberto Lopez Perez, Tuxpan (MX); Paulo Lopez Meyer, Tlaquepaque (MX); Alejandro Ibarra Von Borstel, Zapopan (MX); Julio Cesar Zamora Esquivel, Zapopan (MX); Hector Alfonso Cordourier Maruri, Guadalajara (MX)

(73) Assignee: Intel Corporation, Santa Clara, CA (US)

( * ) Notice: Subject to any disclaimer, the term of this patent is extended or adjusted under 35 U.S.C. 154(b) by 320 days.

(21) Appl. No.: 14/952,507

(22) Filed: Nov. 25, 2015

(65) Prior Publication Data

US 2017/0146333 A1   May 25, 2017

(51) Int. Cl.
*G06F 3/01*   (2006.01)
*G01F 3/04*   (2006.01)
(Continued)

(52) U.S. Cl.
CPC ............ *G06F 1/163* (2013.01); *G01B 7/003* (2013.01); *G06F 3/017* (2013.01)

(58) Field of Classification Search
CPC . G06F 3/01; G06F 3/014; G06F 3/017; G06F 3/044; G05B 15/02
See application file for complete search history.

(56) References Cited

U.S. PATENT DOCUMENTS 1,823,228 A   9/1931   Apfel
1,897,833 A   2/1933   Benway
(Continued)

FOREIGN PATENT DOCUMENTS

CN   101742387 A   6/2010
JP   D3121603 A    5/1991
(Continued)

OTHER PUBLICATIONS

U.S. Appl. No. 14/582,582, entitled "Piezoelectric Sensor Assembly for Wrist Based Wearable Virtual Keyboard," filed Dec. 24, 2014.
(Continued)

*Primary Examiner* — Neel D Shah
(74) *Attorney, Agent, or Firm* — Schwabe, Williamson & Wyatt, P.C.

(57) ABSTRACT

Embodiments of the present disclosure provide techniques and configurations for an apparatus for detection of a change of electromagnetic field in response to a gesture, to identify the gesture that caused the field change. In one instance, the apparatus may include a first conducting component having first features for the disposal on or around a portion of a user's body, to generate an electromagnetic field in response to a receipt of a source signal. The apparatus may further include a second conducting component having second features for the disposal on or around a portion of the user's body, at a distance from the first conducting component, to provide an indication of a change in the electromagnetic field over time, to identify a change of a position of the user's body portion (gesture) that causes the change in the electromagnetic field. Other embodiments may be described and/or claimed.

18 Claims, 8 Drawing Sheets

(51) Int. Cl.
*G06F 1/16* (2006.01)
*G01B 7/00* (2006.01)

(56) References Cited

U.S. PATENT DOCUMENTS

| | | | |
|---|---|---|---|
| 1,935,923 A | 11/1933 | Thoke | |
| 1,935,932 A | 11/1933 | Benway | |
| 1,940,553 A | 12/1933 | Lieber | |
| 2,045,404 A | 6/1936 | Nicholides | |
| 2,062,373 A | 12/1936 | Nicholides | |
| 2,451,317 A | 10/1948 | Blair et al. | |
| 2,613,282 A | 10/1952 | Scaife | |
| 2,813,933 A | 11/1957 | Williams et al. | |
| 2,850,584 A | 9/1958 | Smith | |
| 3,183,312 A | 5/1965 | Salomon et al. | |
| 4,520,238 A | 5/1985 | Ikeda | |
| 5,897,712 A * | 4/1999 | Hanawa | H01J 37/321 118/723 I |
| 6,244,873 B1 * | 6/2001 | Hill | G06F 3/015 434/236 |
| 6,380,923 B1 | 4/2002 | Fukumoto et al. | |
| 6,861,945 B2 * | 3/2005 | Kim | G06F 3/014 340/407.1 |
| 7,148,879 B2 | 12/2006 | Amento et al. | |
| 7,555,136 B2 | 6/2009 | Wang | |
| 7,580,540 B2 | 8/2009 | Zurek et al. | |
| 8,279,091 B1 * | 10/2012 | Tran | G06F 3/017 341/20 |
| 8,856,875 B2 | 10/2014 | Aditya | |
| 9,002,020 B1 | 4/2015 | Kim et al. | |
| 9,094,749 B2 | 7/2015 | Xie et al. | |
| 9,606,682 B2 * | 3/2017 | Walley | G06F 3/044 |
| 9,872,101 B2 | 1/2018 | Cordourier Maruri et al. | |
| 9,924,265 B2 | 3/2018 | Lopez Meyer et al. | |
| 2001/0011496 A1 | 8/2001 | Mishima et al. | |
| 2003/0091134 A1 | 5/2003 | Chi et al. | |
| 2003/0228023 A1 | 12/2003 | Burnett et al. | |
| 2005/0286734 A1 | 12/2005 | Wang | |
| 2006/0140422 A1 | 6/2006 | Zurek et al. | |
| 2007/0064535 A1 | 3/2007 | Burnstad | |
| 2007/0277618 A1 | 12/2007 | Kroeger et al. | |
| 2009/0271004 A1 * | 10/2009 | Zecchin | G05B 15/02 700/13 |
| 2009/0327171 A1 | 12/2009 | Tan et al. | |
| 2010/0331649 A1 | 2/2010 | Chou | |
| 2010/0110368 A1 | 5/2010 | Chaum | |
| 2011/0181510 A1 | 7/2011 | Hakala et al. | |
| 2011/0224481 A1 | 9/2011 | Lee et al. | |
| 2012/0007713 A1 | 1/2012 | Nasiri et al. | |
| 2012/0256821 A1 | 10/2012 | Olsson et al. | |
| 2012/0264482 A1 | 10/2012 | Bhagat et al. | |
| 2012/0265482 A1 | 10/2012 | Grokop et al. | |
| 2012/0282976 A1 | 11/2012 | Suhami | |
| 2012/0306745 A1 | 12/2012 | Moore et al. | |
| 2012/0319940 A1 | 12/2012 | Bress et al. | |
| 2012/0326982 A1 | 12/2012 | Pasquero et al. | |
| 2013/0022220 A1 | 1/2013 | Dong | |
| 2013/0056981 A1 * | 3/2013 | Mullins | F03G 5/06 290/7 |
| 2013/0159705 A1 | 6/2013 | Leedom, Jr. | |
| 2013/0242262 A1 | 9/2013 | Lewis | |
| 2013/0321009 A1 * | 12/2013 | Aliakseyeu | G06F 3/017 324/699 |
| 2014/0029762 A1 | 1/2014 | Xie | |
| 2014/0063129 A1 | 3/2014 | Kondo | |
| 2014/0064536 A1 | 3/2014 | Kim et al. | |
| 2014/0092031 A1 * | 4/2014 | Schwartz | G06F 1/3206 345/173 |
| 2014/0112503 A1 | 4/2014 | Hebenstreit | |
| 2014/0161287 A1 | 6/2014 | Liu et al. | |
| 2014/0176439 A1 | 6/2014 | Keller et al. | |
| 2014/0297217 A1 | 10/2014 | Yuen | |
| 2014/0371906 A1 | 12/2014 | Barajas et al. | |
| 2015/0074797 A1 | 3/2015 | Choi et al. | |
| 2015/0090035 A1 | 4/2015 | Kukita | |
| 2015/0133193 A1 | 5/2015 | Stotler | |
| 2015/0185838 A1 | 7/2015 | Camacho-Perez et al. | |
| 2015/0293580 A1 | 10/2015 | Munoz et al. | |
| 2016/0048161 A1 | 2/2016 | Carceroni et al. | |
| 2016/0070245 A1 | 3/2016 | Lee et al. | |
| 2016/0072041 A1 | 3/2016 | Lal et al. | |
| 2016/0124498 A1 | 5/2016 | Chung et al. | |
| 2016/0246368 A1 | 8/2016 | Camacho-Perez et al. | |
| 2016/0282945 A1 | 9/2016 | Ochoa | |
| 2016/0284135 A1 | 9/2016 | Zamhi | |
| 2016/0378193 A1 | 12/2016 | Rodrigo | |
| 2017/0078788 A1 | 3/2017 | Meyer | |
| 2017/0090583 A1 | 3/2017 | Zamora Esquivel et al. | |

FOREIGN PATENT DOCUMENTS

| | | |
|---|---|---|
| KR | 10-2011-0068579 A | 6/2011 |
| KR | 10-2012-0080852 A | 7/2012 |
| KR | 10-2013-0035290 A | 4/2013 |
| WO | 2009-144363 A1 | 12/2009 |
| WO | 2011/094366 A1 | 4/2011 |
| WO | 2011-083442 A1 | 7/2011 |
| WO | 2015123771 A1 | 8/2015 |
| WO | 2015-131157 A1 | 9/2015 |

OTHER PUBLICATIONS

U.S. Appl. No. 14/865,541, entitled "Activity Detection for Gesture Recognition," filed Sep. 25, 2015.
U.S. Appl. No. 14/854,927, entitled "System for Voice Capture Via Nasal Vibration Sensing," filed Sep. 15, 2015.
U.S. Appl. No. 14/665,536 entitled "Gesture Recognition Mechanism," filed Mar. 23, 2015.
U.S. Appl. No. 14/965,095, entitled "System for Voice Capture Via Nasal Vibration Sensing," filed Dec. 10, 2015.
Raghavendra, J.,"Optomyography: Detection of Muscle Surface Displacement Using Reflective Photo Resistor," MSc. Thesis, KTH Technology and Health, Stockholm 2014, 31 pages.
Barry, D. T., et al., "Acoustic Myography as a Control Signal for an Externally Powered Prosthesis," Archives of Physical Medicine and Rehabilitation, vol. 67, No. 4, 1986, pp. 267-269.
Myo Gesture Control Armband—Wearable Technology by Thalmic Labs, <<https://www.myo.com/connect>> last visited on Mar. 4, 2016.
IEEE—Institute of Electrical and Electronics Engineers, "IEEE standard for safety levels with respect to human exposure to radio frequency electromagnetic fields, 3 kHz to 300 GHz," Tech. Rep. IEEE C95. Jan. 2005, The Institute of Electrical and Electronics Engineers, New York, NY, USA, 2005.
Greene, F. M., "The Near-Zone Magnetic Field of Small Circular-Loop Antenna", Journal of Research of the National Bureau of Standards—C .Engineering and Instrumentation, vol. 71C, No. 4, Oct.-Dec. 1967.
U.S. Appl. No. 14/749,960 entitled "Wearable Device With Gesture Recognition Mechanism," filed Jun. 25, 2015.
International Search Report issued in PCT Application No. PCT/US2016/047206, dated Oct. 27, 2016, 12 pages.
Tamura,Toshiyo, et al.,: "Wearable Photoplethysmographic Sensors—Past and Present", Electronics, No. 3, 2014, pp. 282-302, DOI:10.3390/electronics3020282.
H. Han, J_ Kim, "Artifacts in wearable photoplethysmographs during daily life motions and their reduction with least mean square based active noise cancellation method", Computers in biology and medicine, 42(4), Apr. 2012, pp. 387-393, Abstract only.
K.F. Teng, Y.T. Zhang, "The effect of contacting force on photoplethysmographic signals", Physiological Measurement, No. 25, Aug. 11, 2004, pp. 1323-1335, Abstract only.
Park, C.R. Farrar, A. C. Rutherford, A.N. Robertson, "Piezo-Sensor Self-Diagnostics Using Electrical Impedance measurements", Los Alamos National Laboratory, Technical Report LA-UR-04, Oct. 24-27, 2004, 17 pages.
Piezoelectric Sound Components, muRata catalogue, May 2014.

(56) References Cited

OTHER PUBLICATIONS

Chianura, A., et al.: "Electrooptical muscle contraction sensor", Medical & biological engineering & computing, 48(7), pp. 731-734, Jul. 2010, 12 pages.
U.S. Office Action issued in U.S. Appl. No. 14/854,927, dated Sep. 1, 2016.
Cheng, E.Y., et al: "Forehead pulse oximetry compared with finger pulse oximetry and arterial blood gas measurement", Journal of Clinical Monitoring, Jul. 4, 1988, vol. 4, Issue 3, pp. 223-226, Abstract only.
International Search Report and Written Opinion issued in PCT Application No. PCT/US2016/061420, dated Jan. 18, 2017, 15 pages.
Overly, T.G., et al: "Piezoelectric active-sensor diagnostics and validation using instantaneous baseline data", IEEE Sensors Journal, vol. 9, No. 11, Nov. 2009, pp. 1414-1421, Abstract only.
Lim, J. M., et al: "Recognizing hand gestures using wrist shapes". In Consumer Electronics {ICCE), 2010 Digest of Technical Papers International Conference, IEEE, Jan. 2010, pp. 197-198, Abstract only.
Alian, A. A., et al: "Photoplethysmography." Best Practice & Research Clinical Anaesthesiology, 28(4), Dec. J014, pp. 395-406, Abstract only.
Mason, W.P., et al.: "Methods for Measuring Piezoelectric, Elastic, and Dielectric Coefficients of Crystals and : eramics", Proceedings of the IRE.vol. 42, Jun. 6, 1954, 1 page, Abstract only.
Harrison, Chris, et al.: "Skinput: Appropriating the Body as an Input Surface", http://www.chrisharrison.net/index.php/Research/Skinput, downloaded Mar. 22, 2017, 10 pages.
Final Office Action issued in U.S. Appl. No. 14/965,095, dated May 2, 2017, 21 pages.
U.S. Office Action issued in U.S. Appl. No. 14/965,095, dated Oct. 21, 2016.
International Search Report and Written Opinion issued in PCT Application No. PCT/US2016/047089, dated Oct. 26, 2016.
Hakansson et al., "Resonance Frequencies of the Human Skull in Vivo Department of Applied Electronics", Chalmers University of Technology, Gothenburg, Sweden, Nov. 12, 1993.
Carter, et al., "Estimation of the Magnitude-Squared Coherence Function Via Overlapped Fast Fourier Transform Processing", IEEE Transactions on Audio and Electroacoustics, vol. AU-21, No. 4, Aug. 1973.
Welch, "The Use of Fast Fourier Transform for the Estimation of Power Spectra: A Method Based on Time Averaging Over Short, Modified Periodograms", IEEE Transactions on Audio and Electroacoustics, vol. AU-15, No. 2, Jun. 1967.
International Search Report issued in PCT Application No. PCT/US2016/017413, dated Jul. 6, 2016, 15 pages.
Non-Final Office Action dated Nov. 16, 2016 issued in related U.S. Appl. No. 14/749,960, 16 pages.
Office Action dated Jun. 1, 2017 issued in related U.S. Appl. No. 14/749,960, 18 pages.
Amento, et al."The Sound of One Hand: A Wrist-mounted Bioacoustic Fingertip Gesture Interface," Short Talk: It's All About Sound, CHI 2002, Apr. 20-25, 2002, Minneapolis, Minnesota, USA, pp. 724-725, retrieved on Mar. 15, 2018 from URL <<http://citeseerx.ist.psu.edu/viewdoc/download?doi=10.1.1.10.2398&rep=rep1&type=pdf>>.
Non-Final Office Action dated Oct. 31, 2016, issued in related U.S. Appl. No. 14/665,536, 9 pages.
Final Office Action dated May 18, 2017, issued in related U.S. Appl. No. 14/665,536, 8 pages.
Non-Final Office Action dated Apr. 20, 2018, issued in related U.S. Appl. No. 14/865,541, 52 pages.
International Search Report and Written Opinion received for International Application No. PCT/US2015/062353 14 pages.
Final Office Action dated Oct. 27, 2016, issued in related U.S. Appl. No. 14/582,582, 20 pages.
Non-Final Office Action dated Jul. 19, 2016, issued in related U.S. Appl. No. 14/582,582, 29 pages.
International Search Report and Written Opinion issued in PCT/US2016/040435, dated Oct. 19, 2016.
Non-Final Office Action dated Feb. 2, 2017, issued in related U.S. Appl. No. 14/865,541, 50 pages.
Final Office Action dated Aug. 10, 2017, issued in related U.S. Appl. No. 14/865,541, 44 pages.
Non-Final Office Action dated Oct. 6, 2015, issued in related U.S. Appl. No. 14/142,711, 13 pages.
Final Office Action dated Dec. 27, 2018, issued in related U.S. Appl. No. 14/865,541, 65 pages.

* cited by examiner

APPARATUS FOR DETECTING ELECTROMAGNETIC FIELD CHANGE IN RESPONSE TO GESTURE

FIELD

Embodiments of the present disclosure generally relate to the field of sensor devices, and more particularly, to wearable devices configured to detect a change of electromagnetic field caused by a gesture.

BACKGROUND

Wearable computing devices continue to increase in popularity, and feature increasingly sophisticated functionality, including wireless capabilities. Ubiquitous to this trend are wearable computing devices that offer so-called "natural" input methods such as through voice and gesture. Personal-assistant applications, Internet browsing, and general device usage may be partly or entirely controllable by these natural input methods. Methods for hand gesture detection and recognition use electric, acoustic or optical sensors to measure tissue changes and relate them to hand gestures. These methods provide relative advantages such as unobtrusiveness and low power consumption for wearable applications. Also, these methods may be conveniently realized in wristband or other form factors. However, these methods may be susceptible to sensor location on a user's body and to the quality of the sensor contact with the skin.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Embodiments of the present disclosure include techniques and configurations for an apparatus for detection of a change of electromagnetic field in response to a gesture, to identify the gesture that caused the electromagnetic field change, in accordance with some embodiments. In some embodiments, the apparatus may include a first conducting component having first features for the first conducting component to be disposed on or around a first portion of a user's body, to generate an electromagnetic field in response to a receipt of a source signal. The apparatus may further include a second conducting component having second features for the second conducting component to be disposed on or around a second portion of the user's body, at a distance from the first conducting component, to provide an indication of a change of the electromagnetic field over time. The indication of change of the electromagnetic field over time may be used to identify a change of a position of the first portion of the user's body (e.g., a gesture) that causes the change of the electromagnetic field.

In the following detailed description, reference is made to the accompanying drawings that form a part hereof, wherein like numerals designate like parts throughout, and in which are shown by way of illustration embodiments in which the subject matter of the present disclosure may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

For the purposes of the present disclosure, the phrase "A and/or B" means (A), (B), (A) or (B), or (A and B). For the purposes of the present disclosure, the phrase "A, B, and/or C" means (A), (B), (C), (A and B), (A and C), (B and C), or (A, B, and C).

The description may use perspective-based descriptions such as top/bottom, in/out, over/under, and the like. Such descriptions are merely used to facilitate the discussion and are not intended to restrict the application of embodiments described herein to any particular orientation.

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

The term "coupled with," along with its derivatives, may be used herein. "Coupled" may mean one or more of the following. "Coupled" may mean that two or more elements are in direct physical, electrical, or optical contact. However, "coupled" may also mean that two or more elements indirectly contact each other, but yet still cooperate or interact with each other, and may mean that one or more other elements are coupled or connected between the elements that are said to be coupled with each other. The term "directly coupled" may mean that two or more elements are in direct contact.

Figure 1:
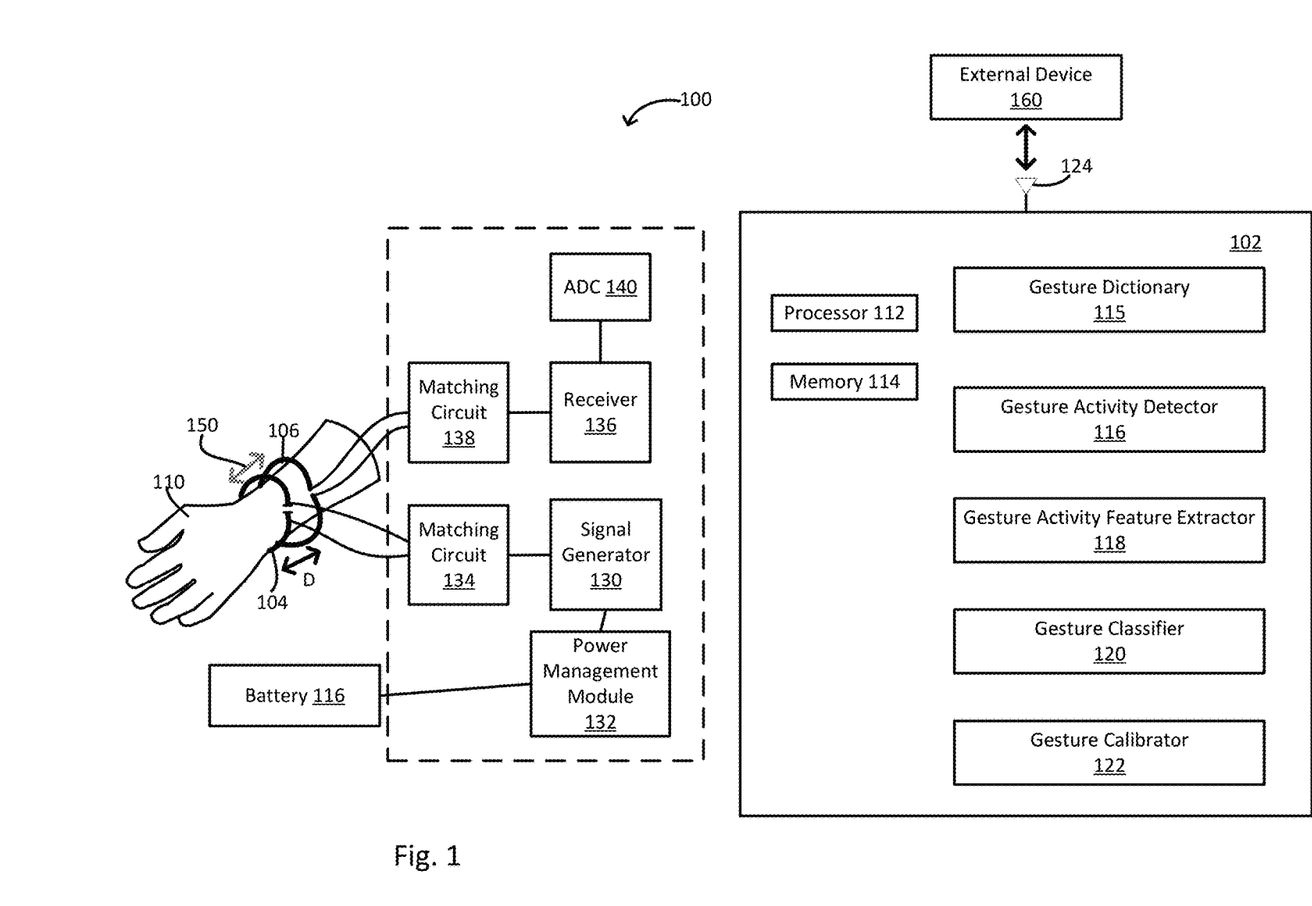
FIG. 1 is a block diagram illustrating an example apparatus incorporated with the teachings of the present disclosure, in accordance with some embodiments.

FIG. 1 is a block diagram illustrating an example apparatus 100 incorporated with the teachings of the present disclosure, in accordance with some embodiments. The apparatus 100 may comprise a wearable device configured to be attachable to a user's body in order to detect a change of electromagnetic field in response to a change of position (e.g., a gesture) by the user's body portion, in order to detect and identify the gesture.

The apparatus 100 may include a first conducting component 104 configured to be disposed on or around a portion of a user's body 110, such as an arm, as shown. The first conducting component 104 may be configured to generate an electromagnetic field 150 in response to a receipt of a source signal. The source signal may be provided by circuitry 142 communicatively coupled with the first conducting component 104. The circuitry 142 may include a signal generator 130, to generate the source signal.

The signal generator 130 may be powered by a power management module 132 of the circuitry 142 configured to manage a power source for the apparatus 100, such as a battery 116 coupled with the power management module 132. The signal generator 130 may be configured to provide, for example, a sine wave voltage signal that may be injected into the first conducting component 104. In embodiments, the source signal may be provided by the signal generator 130 via a first matching circuit 134 of the circuitry 142. The first matching circuit 134 may include hardware, software, or any combination thereof that may perform signal filtering and other conditioning routines to optimize power transfer between the signal generator 130 and the first conducting component 104.

The apparatus 100 may further include a second conducting component 106 configured to be disposed on or around a portion of the user's body, such as portion 110, at a distance D from the first conducting component 104. The second conducting component 106 may be configured to provide an indication of a change in the electromagnetic field 150 over time. The change in the electromagnetic field 150 may be caused by a change of a position of the portion 110 of the user's body, such as a movement (e.g., gesture) of a particular kind, for example. More specifically, the electromagnetic field 150 may induce voltage in the second conducting component 106. The induced voltage may change over time according to the change of the electromagnetic field 150, such as in response to the change of the position of the portion 110 of the user's body.

Figure 2:
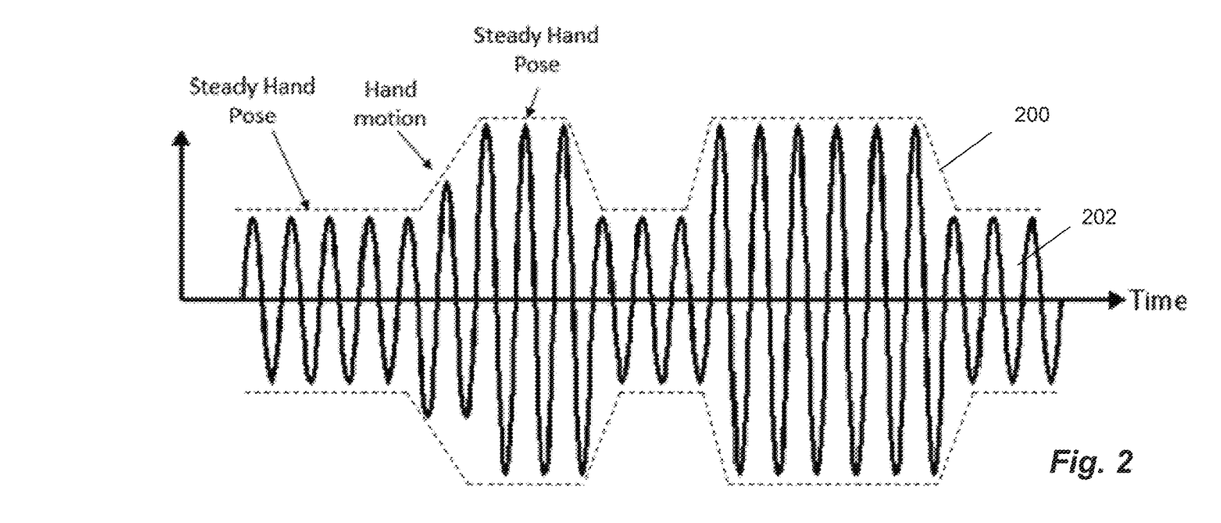
FIG. 2 is an example graph illustrating a voltage signal that may be induced by an electromagnetic field produced by the first conducting component in the second conducting component of the apparatus of FIG. 1, in accordance with some embodiments.

FIG. 2 is an example graph illustrating a voltage signal that may be induced by electromagnetic field 150 produced by the first conducting component 104 in the second conducting component 106 of the apparatus 100, according to some embodiments. The dotted line 200 (called the "envelope" of the signal) follows peaks and minimums of the signal 202 to highlight the times when the user's body portion 110 (e.g., arm) is in a steady position or in motion from one position to another. For example, if the portion 110 is steady at a given position, the voltage signal induced at the second conducting component 106 may comprise a scaled version of the sine signal (not shown) provided to the first conducting component 104. The scaling may occur, for example, due to heat dissipation-related power loss between the conducting components 104 and 106. If the arm moves from one position to another position, the electromagnetic field 150 may change over time accordingly, providing the signal 202 at the second conducting component 106. The signal 202 may have the same period as the source signal (not shown) provided by the signal generator 130, but the peaks and minimums may vary from period to period and may be different for different body portion positions, as shown in FIG. 2. The difference in minimums and peaks in the signal 202 over time may be due to the interaction of the electromagnetic field 150 with the tissue displacing (e.g., when moving the arm) or arrangement of the arm in a different manner (e.g., in a given position).

The voltage signal induced in the second conducting component 106 may be provided to the circuitry 142 communicatively coupled with the second conducting component 106. More specifically, voltage signal may be provided to the receiver 136 (e.g., via second matching circuit 138 configured to provide desired power transfer between the second conducting component 106 and receiver 136, e.g., convert the impedance of the second conducting component 106 into an impedance that matches that of the receiver 136 (within a determined margin) in order to optimize power transfer from the second conducting component 106 into the receiver 136). In embodiments, the receiver 136 may comprise an envelope detector configured to follow the amplitude variation of the signal as shown in FIG. 2.

Figure 3:
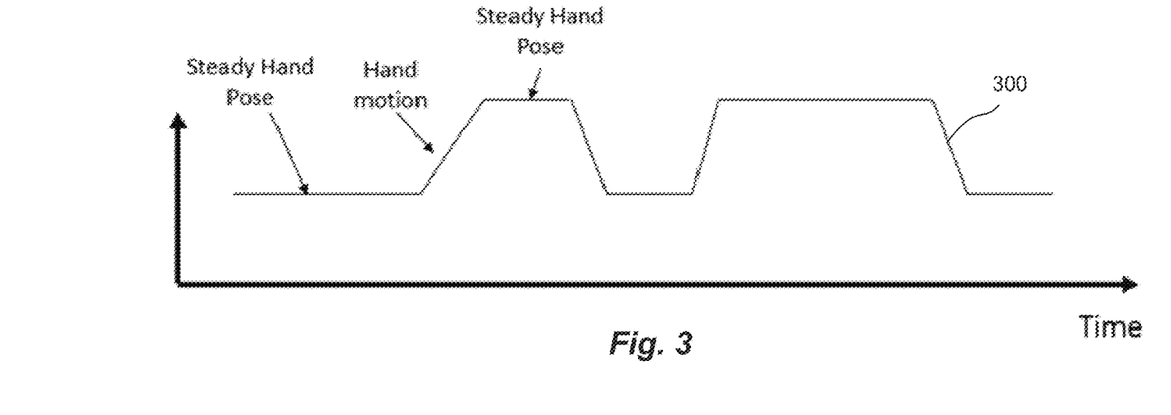
FIG. 3 is an example graph illustrating a voltage signal that may be output by the receiver of the apparatus of FIG. 1, in accordance with some embodiments.

FIG. 3 is an example graph illustrating a voltage signal 300 that may be output by the receiver 136 of the apparatus 100, in accordance with some embodiments. As shown, the voltage signal 300 follows the "envelope" of the signal 202 of FIG. 2. Accordingly, the receiver 136 may provide the output in a form of electrical signal 300 that may vary over time as the envelope of the signal 202 at the second conducting component 106. The receiver 136 may provide the signal 202 to a processing unit 102 of the apparatus 100 (or associated with the apparatus 100) for further processing. The circuitry 142 may include an analog-to-digital converter (ADC) 140 coupled with the receiver 136, to convert the signal 202 into a digital form and provide the digitized signal 202 to the processing unit 102. The processing may include detecting and identifying gestures of the user's body portion 110, based at least in part on the provided signal 202, as described below in greater detail.

In embodiments, the first and second conducting components 104 and 106 may be fabricated from a conducting material, such as a metal. For example, the conducting components may be manufactured from gold, silver, copper, aluminum, steel, etc. Other materials may be used, as long as their conductivity is sufficient to provide power loss below a determined threshold. The conducting components 104, 106 may be provided in different shapes, depending on desired performance of the conducting components. For example, first and/or second conducting components 104, 106 may comprise a patch (e.g., a planar square patch) disposable on the user's body portion (e.g., same or different portions) at the distance D from each other. In another example, first and/or second conducting components 104, 106 may comprise a substantially loop-shaped body disposable on the user's body portion (e.g., same or different portions) at the distance D from each other.

In some embodiments, the first and second conducting components 104, 106 may be conducting patches, or be loop-shaped, as shown in FIG. 1. In other embodiments, the first conducting component 104 may be a patch, and second conducting component 106 may be loop-shaped, or vice versa. In some embodiments, the first and second conducting components 104, 106 may have any shape suitable for particular application to a user's body portion, whose gesture is to be identified. The distance D between the first and second conducting components 104, 106 may be determined empirically in order to provide a desired or determined level of power transfer between the first and second conducting components 104, 106.

In some embodiments, the first conducting component 104 may be disposed on a portion of the user's body whose gesture is to be identified using the apparatus 100. For example, the first conducting component 104 may be disposed on or around the arm 110 as illustrated in FIG. 1, a wrist, a finger, a neck, a hand, a leg, an ankle, or another body portion. The second conducting component 106 may be disposed on or around the same body portion (e.g., on the same arm 110, as illustrated in FIG. 1), or on a different body portion (e.g., other arm, hand, ankle, neck, leg, etc.).

The processing unit 102 may be coupled with receiver 136, signal generator 130, and power management module 132 as shown in FIG. 1. The processing unit 102 may be configured to process the voltage signal and to identify the gesture associated with the user's body portion, based at least in part on the processed voltage signal 202.

In embodiments, the components of the apparatus 100 described above may be distributed in different ways. For example, the circuitry 142 including some or all of power management module 132, signal generator 130, matching circuits 134 and 138, receiver 136 and ADC 140 may be disposed in a printed circuit board (PCB). In some embodiments, the processing unit 102 may be disposed in the PCB and communicatively coupled with an external device 160, such as a host computing device via a wireless transceiver 124. In some embodiments, the processing unit may be located at the external device 160 which may be communicatively coupled with the apparatus 100, e.g., via the transceiver 124.

The wireless transceiver 124 communicatively coupled with external device 160 may include one or more radios capable of transmitting and receiving signals using various suitable wireless communications techniques. Such techniques may involve communications across one or more wireless networks. Some example wireless networks include (but are not limited to) wireless local area networks (WLANs), wireless personal area networks (WPANs), wireless metropolitan area network (WMANs), cellular networks, and satellite networks. In communicating across such networks, the wireless transceiver 124 may operate in accordance with one or more applicable standards in any version. To this end, the wireless transceiver 124 may include, for instance, hardware, circuits, software, or any combination thereof that allows communication with external computer systems.

In some specific non-limiting examples, the wireless transceiver 124 may comport with the IEEE 802.11 standard (e.g., Wi-Fi), a Bluetooth®, ZigBee®, near-field communication, or any other suitable wireless communication standard. In addition, the wireless transceiver circuit 124 may comport with cellular standards such as 3G (e.g., EV-DO, W-CDMA) and 4G wireless standards (e.g., HSPA+, WIMAX, LTE).

Figure 4:
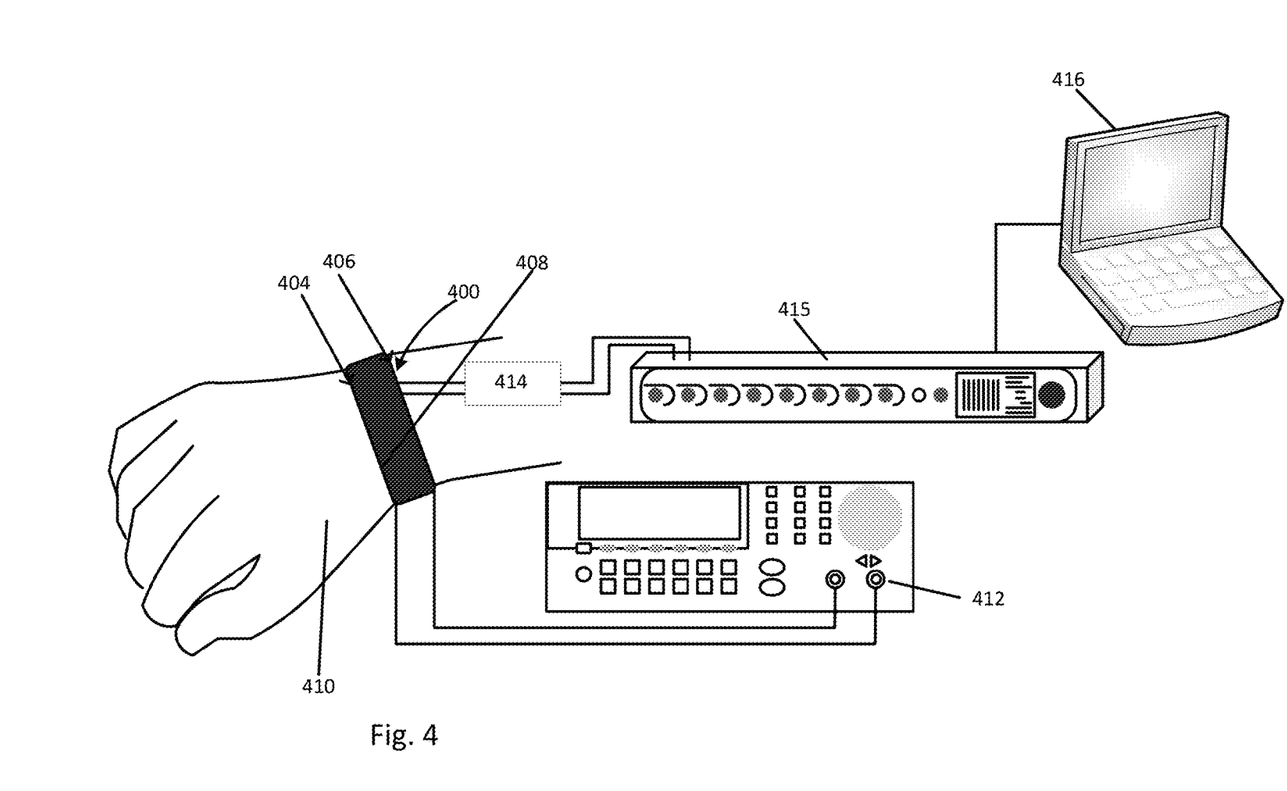
FIG. 4 is an example experimental setup for the apparatus for gesture detection and identification based on a detection of a change of electromagnetic field in response to a gesture, in accordance with some embodiments.
Figure 5:
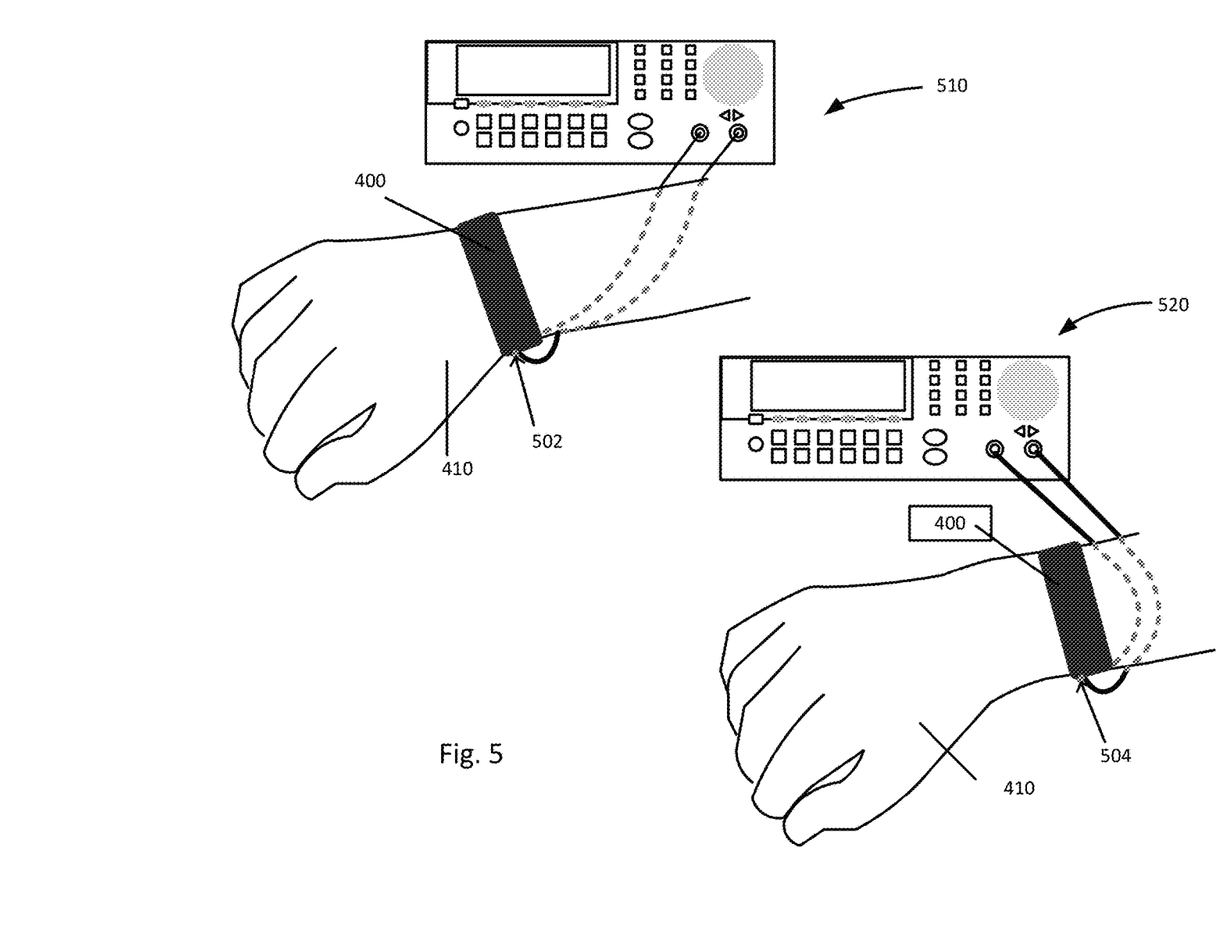
FIG. 5 illustrates example views of experimental setup for testing the apparatus of FIG. 4, such as a wearable device, in accordance with some embodiments.

In some embodiments, the apparatus 100 may comprise a wearable device that may include a band or a strap to be disposed on or around the user's body portion, for example, as shown in FIGS. 4-5 and described below. The PCB having the circuitry 142 may be disposed inside the band. In embodiments, the first and second conducting components 104, 106 may be disposed on the band at the distance D from each other.

In general, the apparatus 100 may be implemented as a wearable knee strap, a wearable chest strap, a wearable neck strap, a wearable wrist strap, or a wearable foot strap, or the like. As described above, the apparatus 100 may be distributed between one or more user's body portions, as convenient. For example, one portion of the apparatus 100 including the first conducting component 104 may be placed on the user's arm, while another portion including the second conducting component 106 may be placed elsewhere, e.g., on the ankle, another arm, and the like. In principle, the apparatus 100 may be applied to any human joint or body part, such as a knee, arm, neck, chest, forehead, foot, leg, or the like.

The apparatus 100 may further include a battery 116 coupled with the power management module 132 and configured to provide power supply to the components of the apparatus 100. In some embodiments, the power management module 132 may be configured to power on the signal generator 130 continuously or periodically, in order to save battery power. In some embodiments, the power management module 132 may be configured to power on the signal generator 130 on a "wake-up" basis, when a movement of the user's body portion is detected, e.g., by a sensor (e.g., piezoelectric sensor or accelerometer, not shown) associated with the apparatus 100.

The processing unit 102 may include components configured to facilitate gesture identification based on the readings of signal 202 provided by the receiver 136. The processing unit 102 may provide these components through, for example, a plurality of machine-readable instructions stored in memory 114 and executable on a processor 112 of the processing unit 102. More generally, some of the components may comprise hardware, circuitry, software instructions, or any combination thereof. Moreover, one or more of the components may be physically located external to the processing unit 102, e.g., at a host computing device 160.

As shown, the processing unit 102 may include a gesture dictionary 115, a gesture activity detector 116, a gesture activity feature extractor 118, a gesture classifier 120, and a gesture calibrator 122.

The gesture dictionary 115 may provide a definition of specific recognizable gestures (e.g., gesture identifiers), and a map that associates each gesture with a corresponding action. The gesture dictionary 115 may store reference signals that represent characteristics for each recognizable gesture. For example, each reference signal may provide a number of samples that collectively represent a waveform for the gesture. Moreover, each recognizable gesture may include a number of reference waveforms. A user may execute a training process in which a user performs each gesture to have a reference signal stored in the gesture dictionary 115 for a given gesture. In some cases, the memory 114 associated with the processing unit 102 may store the gesture dictionary 115.

The gesture activity detector 116 may receive a digitized signal 202 from the receiver 136, and detect probable gesture activity therein. The gesture activity detector 116 may use the gesture activity feature extractor 118 to extract the particular features of probable gesture activity. For instance, the gesture activity feature extractor 118 may derive the energy feature (e.g., in Joules) of a given signal and the particular start and end position of the probable activity within the digitized signal.

The gesture activity detector 116 may utilize the extracted features to trigger additional gesture recognition processing on detected probable gesture activity. In some cases, the gesture classifier 120 may analyze the signal having the probable gesture activity and may correlate the same against reference signals stored in the gesture dictionary 115. The gesture classifier 120 may recognize a particular gesture, and may then cause a corresponding command to be executed. The processing unit 102 may then execute or cause to be executed a corresponding command for the particular gesture, such as a mouse-click or other navigation command, for example.

The gesture calibrator 122 may provide a user with a process by which to train or otherwise improve gesture recognition accuracy. For example, the gesture calibrator 122 may present a user interface, or other indicator such as an auditory prompt ("Please clench your fingers into a fist"), that may request the user perform a particular gesture. In some cases, the request to perform a particular gesture may accompany a tutorial that visually/aurally represents the particular gesture in a series of steps. The gesture calibrator 122 may detect performance of the particular gesture and store a measured reference signal for the gesture in the gesture dictionary 115. The gesture calibrator 122 may request a user perform the same gesture a number of times to ensure a suitable number of reference signals get stored in the gesture dictionary 115. This training process may also include determining a so-called "fit-level" such that a reference signal is associated with the particular fit-level it was trained at.

As described above, a change of pattern of electromagnetic field over time in response to a change of a position of the user's body portion may be used to identify a gesture of the user's body portion, using the components of the processing unit 102. However, gesture identification and recognition is just one example of the use of the detected change of the electromagnetic field caused by the body portion's position change. It should be appreciated that embodiments disclosed herein that describe the detection of change of electromagnetic field caused by a body portion's position change may extend beyond gesture recognition and identification for controlling a computer system/software application and may be applicable in a wide variety of applications.

FIG. 4 is an example experimental setup for the apparatus for gesture detection and identification based on a detection of a change of electromagnetic field in response to a gesture, in accordance with some embodiments. The apparatus 100 may be implemented as a wearable device 400 with first and second loop-shaped conducting components 404, 406 disposed in a band 408. The apparatus may be disposed around the user's arm 410, as shown. The signal generator 412 may provide a source signal to the first conducting component 404, to generate an electromagnetic field. Voltage induced by the electromagnetic field in the second conducting component 406 may be received by an envelope detector 414 and input into an audio interface (e.g., MOTU 8Pre® or other type), to filter the voltage signal. The filtered signal may be processed on a computing device 416. The example setup is provided for the assessment of gesture detection performance using conductive components as described in reference to FIGS. 1-3.

FIG. 5 illustrates example views of experimental setup for testing the apparatus of FIG. 4, such as wearable device 400, in accordance with some embodiments. As shown, the wearable device 400 may be placed in different positions on the user's body portion, such as user's arm 410. For example, view 510 shows the wearable device 400 placed on the user's arm 410 in Position 1 (502), close to the wrist. View 520 shows the wearable device 400 placed on the user's arm 410 in Position 2 (504), away from the wrist.

The wearable device 400 was tested to determine the performance of the conducting components as providers of an indication of electromagnetic field change in response to a user's gesture, and to determine whether a position of the wearable device on the portion of a user's body may affect the gesture identification. Some of the experiments and their results are described below.

Figure 6:
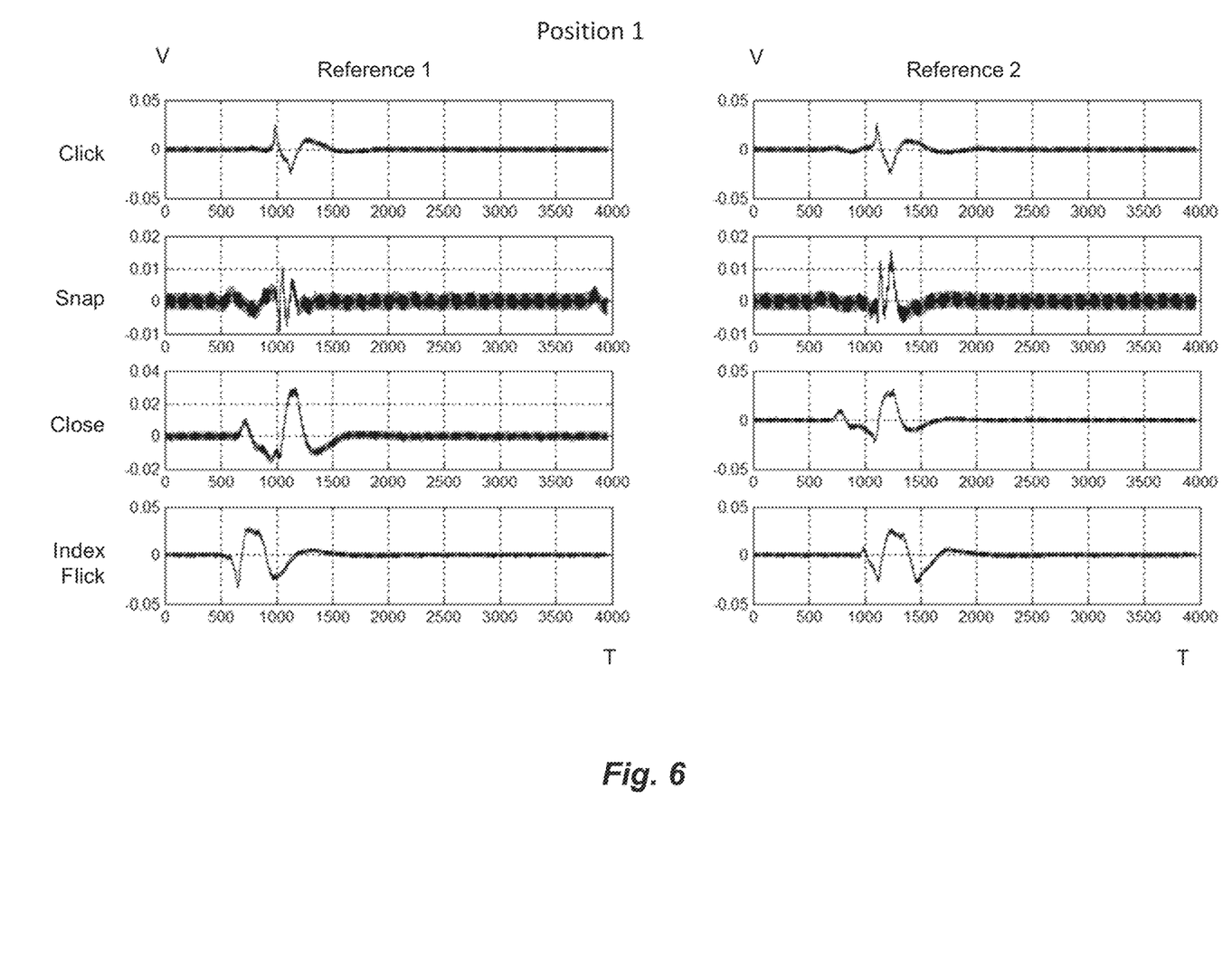
FIGS. 6-7 illustrate example reference signals provided by the wearable device of FIG. 4 in different positions on the user's body portion, in accordance with some embodiments.
Figure 7:
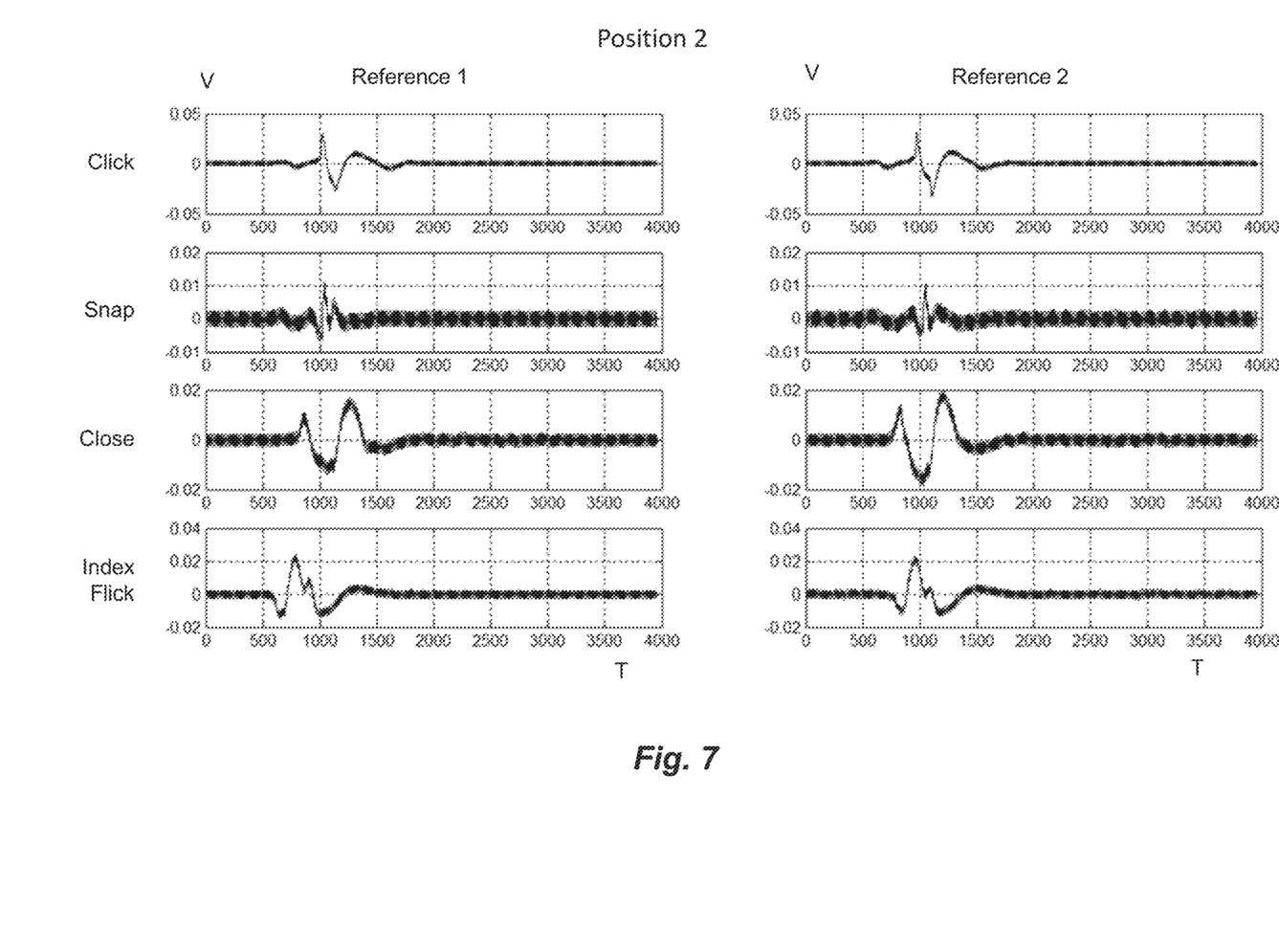

FIGS. 6-7 illustrate example reference signals provided by the wearable device 400 in different positions on the user's body portion, in accordance with some embodiments. More specifically, FIGS. 6 and 7 illustrate reference signals (voltages as function of time) for different types of gestures provided by the wearable device 400 disposed in Positions 1 and 2 as described in reference to FIG. 5, respectively. With reference to FIG. 4, the reference signals (and test signals recorded for comparison with reference signals) may include voltage time variations that may be delivered by the receiver (e.g., envelope detector 414), digitized by the ADC (interface 415) and stored in memory of the computing device 416.

The gestures may include (for this example experiment, but may not be limited to) the following types. Click: slight touch of the dorsal face of the hand with the wearable device with two fingers from the free hand; Snap: press middle finger against thumb and release the finger suddenly in a downward motion towards the palm; Fist-Hold (Close): from a relaxed, semi-open state, close hand in fist and hold for some time; Index Flick: hold index finger with thumb and release the finger forward to the extended position.

A number of test signals associated with various movements of a user's body portion (e.g., arm 410) may be recorded. In the described example, about 60 test signals have been recorded and cross-correlated with each reference signal of FIGS. 6-7. A cross-correlation may be performed between the test signals and each of the references. If cross-correlation is higher than a determined threshold (e.g., 0.6), the gesture may be considered identified. The test results (not shown for brevity) provided the desired level of gesture identification based on the detected change of the electromagnetic field using conducting components compared to existing solutions (e.g., involving piezoelectric sensors). The threshold value may be determined empirically based on the overall performance of the system. The value chosen may allow for the highest number of true accepts and minimum false rejects and false accepts (described below).

To test whether a placement of the wearable device on the user's arm makes any difference in performance, the following experiments have been done. The signals of both positions were combined to form a single set of 60 signals per gesture. It will be understood that the number of signals used for the test may vary depending on a desired margin of error. The reference signals used for Position 1 shown in FIG. 6 were used as references and the remaining as test signals. To have further evidence, the references used for Position 2 shown in FIG. 7 were alternatively used as references. In other words, the experiment exemplified the scenario when the wearable device was calibrated at a single position but used at both positions.

Figure 8:
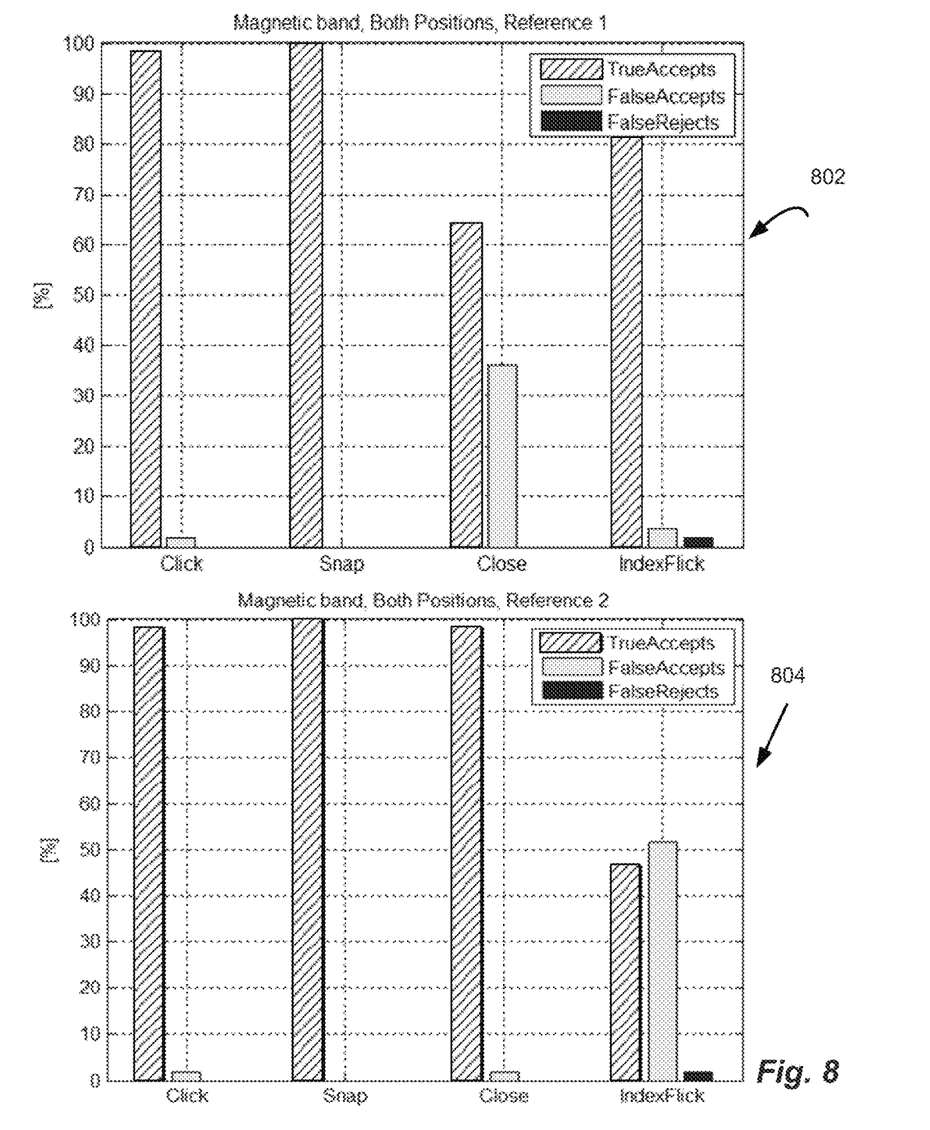
FIG. 8 illustrates example graphs showing test results of the wearable device of FIG. 4 in different positions on the user's body portion, in accordance with some embodiments.

FIG. 8 illustrates example graphs showing test results of the wearable device 400 in different positions on the user's body portion, in accordance with some embodiments. More specifically, graph 802 illustrates percentages of correct identifications of a gesture (true accepts), incorrect identifications (false accepts), and incorrect rejections of gestures (false rejects) for Reference 1 signal (FIGS. 6-7), for Positions 1 and 2 of the wearable device on the user's hand. Graph 804 illustrates percentages of true accepts, false accepts, and false rejects for Reference 2 signal (FIGS. 6-7), for Positions 1 and 2 of the wearable device on the user's hand. As shown in graphs 802 and 804, gesture identification using the wearable device as described above may be susceptible within a desired margin to the wearable device position on the user's body portion. As shown in FIG. 8, identification of one gesture type (e.g., Index Flick) of four tested was somewhat impacted by the position of the wearable device. In summary, the wearable device described above may not need to be recalibrated for different positions on the user's body part. The test results further demonstrated that the wearable device may provide the electromagnetic field that complies with limits for safe magnetic field exposure.

Figure 9:
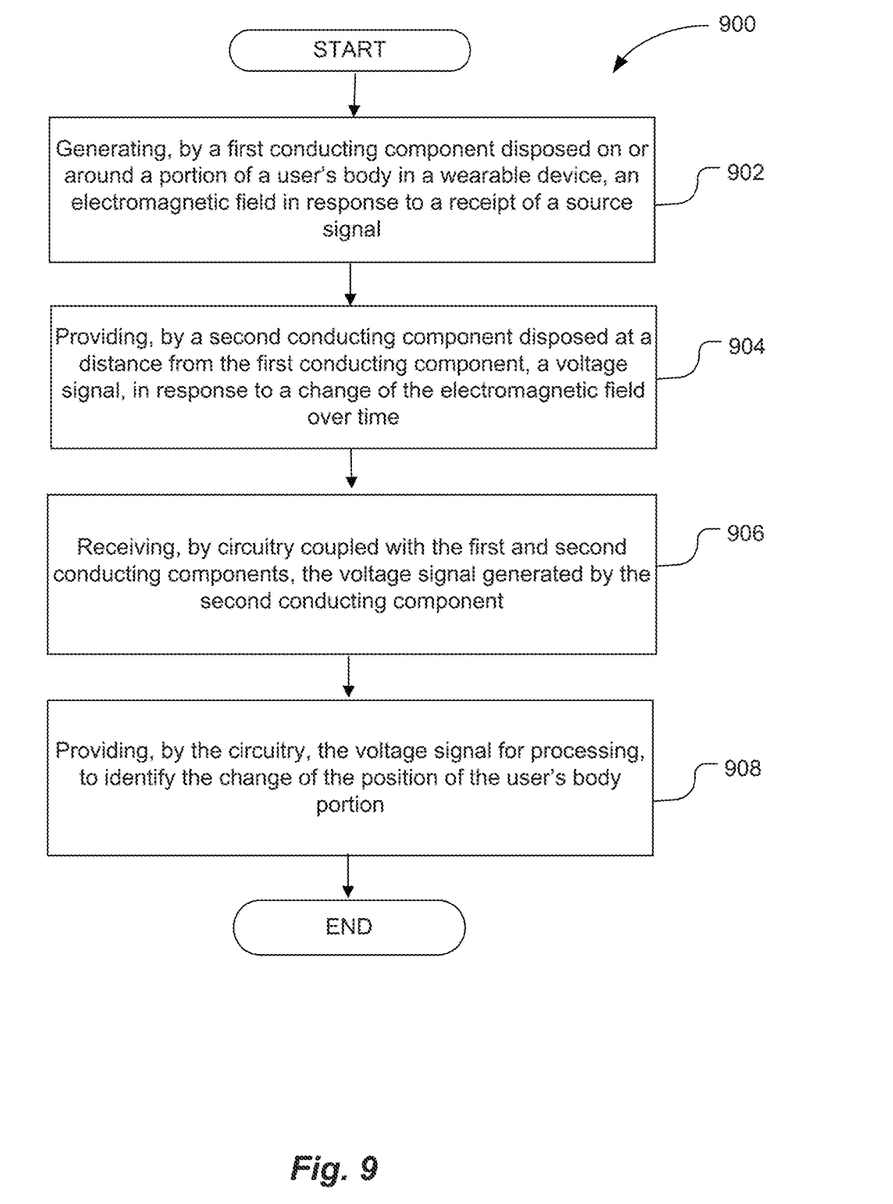
FIG. 9 is a process flow diagram for detection, by an apparatus, of a change of electromagnetic field in response to a gesture, to identify the gesture that caused the electromagnetic field change, in accordance with some embodiments.

FIG. 9 is a process flow diagram for detection, by an apparatus, of a change of electromagnetic field in response to a gesture, to identify the gesture that caused the electromagnetic field change, in accordance with some embodiments. The process 900 may comport with some of the apparatus embodiments described in reference to FIGS. 1-4. For example, the apparatus may comprise a wearable device 400 of FIG. 4. In alternate embodiments, the process 900 may be practiced with more or fewer operations, or a different order of the operations.

The process 900 may begin at block 902 and include generating, by a first conducting component disposed on or around a portion of a user's body in a wearable device, an electromagnetic field in response to a receipt of a source signal provided by circuitry disposed in the wearable device and communicatively coupled to the first and second conducting components. As described in reference to FIG. 1, the circuitry may be provided in a PCB disposed in the wearable device.

At block 904, the process 900 may include providing, by a second conducting component disposed at a distance from the first conducting component, a voltage signal, in response to a change of the electromagnetic field over time. In some embodiments, the second conducting component may be disposed in the wearable device. As described in reference to FIG. 1, the conducting components may have different shapes, such as a loop-shaped body or patch-shaped body.

At block 906, the process 900 may include receiving, by the circuitry communicatively coupled with the first and second conducting components, the voltage signal generated by the second conducting component. For example, the voltage signal may be received by a part of the circuitry comprising a receiver, such as an envelope detector described in reference to FIGS. 1-3.

At block 908, the process 900 may include providing, by the circuitry, the voltage signal for processing, to identify the change of the position of the user's body portion. The circuitry, such as an envelope detector, may be communicatively coupled with a processor configured to process the received voltage signal. The processor may be disposed in the wearable device or distributed through a network, for example, to an external computing device communicatively coupled with the wearable device. The position change of the user's body portion (e.g., an arm or hand) may correspond to a particular gesture. The gesture may be identified based on the provided voltage signal as a function of time, as described in reference to FIGS. 1 and 6-8.

Example 1 is an apparatus for detecting and recognizing a gesture, comprising: a first conducting component having first features for the first conducting component to be disposed on or around a first portion of a user's body, to generate an electromagnetic field in response to a receipt of a source signal; and a second conducting component having second features for the second conducting component to be disposed on or around a second portion of the user's body, at a distance from the first conducting component, to provide an indication of a change in the electromagnetic field over time, to identify a change of a position of the first portion of the user's body that causes the change in the electromagnetic field.

Example 2 may include the subject matter of Example 1, wherein the first features comprise a substantially loop-shaped body to house the first conducting component and dispose the first conducting component around the user's first body portion, or a patch to house the first conducting component and dispose the first conducting component on the user's first body portion.

Example 3 may include the subject matter of Example 1, wherein the second features comprise a substantially loop-shaped body to house the second conducting component and dispose the second conducting component around the user's second body portion at the distance from the first conducting component, or a patch to house the first conducting component and dispose the second conducting component on the user's second body portion at the distance from the first conducting component.

Example 4 may include the subject matter of any of Examples 1 to 3, wherein to provide an indication of a change in the electromagnetic field includes to generate a voltage signal that is induced by the change of the electromagnetic magnetic field over time, wherein a variation of the voltage signal indicates the corresponding change of the position of the first portion of the user's body.

Example 5 may include the subject matter of Example 4, wherein the apparatus further comprises: a source signal generator coupled with the first conducting component, to generate the source signal for the provision of the electromagnetic field by the first conducting component; a power source to provide power to the source signal generator; and a receiver coupled with the second conducting component, to receive the voltage signal generated by the second conducting component.

Example 6 may include the subject matter of Example 5, wherein the apparatus further comprises: first and second matching circuits, coupled with the source signal generator and the receiver respectively, to provide a desired level of power transfer between the source signal generator and the first conducting component, and the second conducting component and the receiver; an analog-to-digital converter (ADC), to convert the received voltage signal into a digital format; and a transceiver, to provide the converted voltage signal in a digital form to an external device.

Example 7 may include the subject matter of Example 6, further comprising a printed circuit board (PCB), wherein at least some of the source signal generator, the power source, the first and second matching circuits, the receiver, the ADC, and the transceiver are disposed in the PCB.

Example 8 may include the subject matter of Example 7, further comprising a processor to process the voltage signal and to identify the gesture associated with the user's body portion, based at least in part on the processed voltage signal, wherein the processor is disposed on the PCB or on the external device, wherein the external device is a host computing device.

Example 9 may include the subject matter of Example 8, wherein the first and second body portions comprise a portion of the user's body, wherein the apparatus is a wearable device that further comprises a band to be disposed on or around the user's body portion, wherein the PCB is disposed in the band, and wherein the first and second conducting components are disposed on the band at the distance from each other.

Example 10 may include the subject matter of Example 9, wherein the position change of the user's body portion corresponds to a gesture provided by the user's body portion, wherein the user's body portion is one of: a wrist, a finger, a neck, an arm, a leg, or an ankle.

Example 11 may include the subject matter of Example 10, wherein the processor includes a gesture classifier module.

Example 12 is a wearable device to be disposed on or around a portion of a user's body, wherein the wearable device comprises: a first conducting component, to generate an electromagnetic field in response to a receipt of a source signal; and a second conducting component disposed at a distance from the first conducting component, to generate a voltage signal in response to a change of the electromagnetic field over time; and a printed circuit board (PCB), including circuitry coupled with the first and second conducting components, to generate the source signal for provision of the electromagnetic field by the first conducting component and to receive the voltage signal generated by the second conducting component, to identify a change of a position of the user's body portion that causes the change of the electromagnetic field.

Example 13 may include the subject matter of Example 12, wherein the first conducting component comprises a substantially loop-shaped body to dispose the first conducting component around the user's body portion, or a patch to house the first conducting component and dispose the first conducting component on the user's body portion.

Example 14 may include the subject matter of Example 12, wherein the second conducting component comprises a substantially loop-shaped body to dispose the second conducting component around the user's body portion, at the distance from the first conducting component, or a patch to dispose the second conducting component on the user's body portion at the distance from the first conducting component.

Example 15 may include the subject matter of Example 12, wherein the circuitry is further to generate the source signal for the provision of the electromagnetic field by the first conducting component.

Example 16 may include the subject matter of Example 15, further comprising a processor, to process the voltage signal and to identify a gesture that corresponds to the change of the position of the user's body portion based on the processed voltage signal, wherein the processor is disposed on the PCB or on an external device, wherein the external device is a host computing device.

Example 17 may include the subject matter of Example 16, further comprising a band to be disposed on or around the user's body portion, wherein the first and second conducting components and the PCB are disposed on the band.

Example 18 is a method for detecting and recognizing a gesture, comprising: generating, by a first conducting component disposed on or around a portion of a user's body in a wearable device, an electromagnetic field in response to a receipt of a source signal; and generating, by a second conducting component disposed at a distance from the first conducting component, a voltage signal, in response to a change of the electromagnetic field over time, to identify a change of a position of the user's body portion that causes the change of the electromagnetic field.

Example 19 may include the subject matter of Example 18, further comprising: receiving, by circuitry coupled with the first and second conducting components, the voltage signal generated by the second conducting component; and providing, by the circuitry, the voltage signal for processing, to identify the change of the position of the user's body portion, wherein a position of the user's body portion corresponds to the gesture to be identified by the wearable device or an external device that is to process the voltage signal.

Example 20 may include the subject matter of Example 19, further comprising: generating, by the circuitry, the source signal to provide to the first conducting component.

Example 21 may include the subject matter of Example 20, wherein the circuitry is disposed in the wearable device.

Example 22 may include the subject matter of Example 20, wherein providing the voltage signal for processing includes: digitizing, by the circuitry, the voltage signal; and sending, by the circuitry, the digitized voltage signal to a processor communicatively coupled with the circuitry, for processing.

Example 23 is an apparatus for detecting and recognizing a gesture, comprising: means for generating an electromagnetic field in response to a receipt of a source signal; and means for generating a voltage signal, in response to a change of the electromagnetic field over time, to identify a change of a position of a user's body portion that causes the change of the electromagnetic field, wherein the means for generating a voltage signal is disposed at a distance from the means for generating an electromagnetic field.

Example 24 may include the subject matter of Example 23, further comprising: means for receiving the voltage signal generated by a second conducting component; and means for providing the voltage signal for processing, to identify the change of the position of the user's body portion, wherein a position of the user's body portion corresponds to the gesture to be identified by a wearable device or an external device that is to process the voltage signal.

Various operations are described as multiple discrete operations in turn, in a manner that is most helpful in understanding the claimed subject matter. However, the order of description should not be construed as to imply that these operations are necessarily order dependent. Embodiments of the present disclosure may be implemented into a system using any suitable hardware and/or software to configure as desired.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims and the equivalents thereof.

What is claimed is:

1. An apparatus, comprising:
a first conducting component to be disposed on or around a user's body, to generate an electromagnetic field in response to a receipt of a source signal;
a source signal generator powered by a power source and coupled with the first conducting component, to generate the source signal for provision of the electromagnetic field;
a second conducting component to be disposed on or around the user's body, at a distance from the first conducting component, to provide an indication of a change in the electromagnetic field over time, wherein the electromagnetic field generated by the first conducting component is to induce a voltage signal in the second conducting component, wherein the voltage signal induced in the second conducting component comprises a scaled version of the source signal provided to the first conducting component, due at least in part to power loss between the first and second conducting components, wherein a change of the induced voltage signal is to indicate a change of a position of a portion of the user's body that causes the change in the electromagnetic field;

a receiver coupled with the second conducting component, to receive the voltage signal generated by the second conducting component; and first and second matching circuits, coupled with the source signal generator and the receiver, to provide a power transfer between the source signal generator and the first conducting component, and between the second conducting component and the receiver respectively, wherein the received voltage signal is converted to a digital signal, and provided to an external device.

2. The apparatus of claim 1, wherein the first conducting component comprises a substantially loop-shaped body to house the first conducting component and dispose the first conducting component around the user's body, or a patch to house the first conducting component and dispose the first conducting component on the user's body.

3. The apparatus of claim 1, wherein the second conducting component comprises a substantially loop-shaped body to house the second conducting component and dispose the second conducting component around the user's body at the distance from the first conducting component, or a patch to house the first conducting component and dispose the second conducting component on the user's body at the distance from the first conducting component.

4. The apparatus of claim 1, wherein the apparatus further comprises:

an analog-to-digital converter (ADC), to convert the received voltage signal into the digital signal; and a transceiver, to provide the converted voltage signal to the external device.

5. The apparatus of claim 4, further comprising a printed circuit board (PCB), wherein at least some of the source signal generator, the power source, the first and second matching circuits, the receiver, the ADC, and the transceiver are disposed in the PCB.

6. The apparatus of claim 5, further comprising a processor to process the voltage signal and to identify a gesture associated with the user's body portion, based at least in part on the processed voltage signal, wherein the processor is disposed on the PCB or on the external device, wherein the gesture corresponds to the change of the position of the portion of the user's body, and wherein the external device is a host computing device.

7. The apparatus of claim 6, wherein the apparatus is a wearable device that further comprises a band to be disposed on or around the user's body portion, wherein the PCB is disposed in the band, and wherein the first and second conducting components are disposed on the band at the distance from each other.

8. The apparatus of claim 7, wherein the position change of the user's body portion corresponds to a gesture provided by the user's body portion, wherein the user's body portion is one of: a wrist, a finger, a neck, an arm, a leg, or an ankle.

9. The apparatus of claim 8, wherein the processor includes a gesture classifier module.

10. A wearable device to be disposed on or around a portion of a user's body, wherein the wearable device comprises:

a first conducting component, to generate an electromagnetic field in response to a receipt of a source signal; and a second conducting component disposed at a distance from the first conducting component, to generate a voltage signal that is induced by the electromagnetic field generated by the first conducting component, to provide an indication of a change of the electromagnetic field over time, wherein the voltage signal induced in and generated by the second conducting component comprises a scaled version of the source signal provided to the first conducting component, due at least in part to power loss between the first and second conducting components; and a printed circuit board (PCB), including circuitry coupled with the first and second conducting components, to generate the source signal for the generation of the electromagnetic field by the first conducting component and to receive the voltage signal generated by the second conducting component, to indicate a change of a position of a user's body portion that causes the change of the electromagnetic field, wherein the PCB includes a source signal generator powered by a power source and coupled with the first conducting component, to generate the source signal for provision of the electromagnetic field; a receiver coupled with the second conducting component, to receive the voltage signal generated by the second conducting component; first and second matching circuits, coupled with the source signal generator and the receiver, to provide a power transfer between the source signal generator and the first conducting component, and between the second conducting component and the receiver respectively; wherein the received voltage signal is converted to a digital signal, and provided to an external device.

11. The wearable device of claim 10, wherein the first conducting component comprises a substantially loop-shaped body to dispose the first conducting component around the user's body portion, or a patch to house the first conducting component and dispose the first conducting component on the user's body portion.

12. The wearable device of claim 10, wherein the second conducting component comprises a substantially loop-shaped body to dispose the second conducting component around the user's body portion, at the distance from the first conducting component, or a patch to dispose the second conducting component on the user's body portion at the distance from the first conducting component.

13. The wearable device of claim 10, further comprising an analog-to-digital converter (ADC), to convert the received voltage signal into the digital signal; and a transceiver, to provide the converted voltage signal to the external device.

14. The wearable device of claim 13, further comprising a processor, to process the voltage signal and to identify a gesture that corresponds to the change of the position of the user's body portion based on the processed voltage signal, wherein the processor is disposed on the PCB or on an external device, wherein the external device is a host computing device.

15. The wearable device of claim 14, further comprising a band to be disposed on or around the user's body portion, wherein the first and second conducting components and the PCB are disposed on the band.

16. A method, comprising: providing, by a source signal generator of a circuitry disposed in a wearable device;

a source signal, in response to powering by a power source provided in the wearable device;

generating, by a first conducting component disposed on a user's body in the wearable device and coupled with the source signal generator, an electromagnetic field in response to a receipt of the source signal; and generating, by a second conducting component of the wearable device, disposed at a distance from the first conducting component, a voltage signal induced by the electromagnetic field generated by the first conducting component, to indicate a change of the electromagnetic field over time, including forming the voltage signal as a scaled version of the source signal provided to the first conducting component, due at least in part to power loss between the first and second conducting components, wherein the generated voltage signal is to indicate a change of a position of a portion of the user's body that causes the change of the electromagnetic field;

receiving, by a receiver of the circuitry, the voltage signal generated by the second conducting component, the receiver coupled with the second conducting component, wherein providing the source signal and receiving the voltage signal includes providing, by first and second matching circuits coupled with the source signal generator and the receiver, a power transfer between the source signal generator and the first conducting component, and between the second conducting component and the receiver respectively; and processing, by the circuitry, the voltage signal, wherein the voltage signal is to be converted in a digital signal and provided to an external device for further processing.

17. The method of claim 16, wherein processing the voltage signal includes converting, by an analog-to-digital converter (ADC), the received voltage signal into the digital signal;

and transmitting, by a transceiver, the digital signal to the external device for further processing.

18. The method of claim 17, wherein providing the voltage signal for processing includes:

sending, by the transceiver, the digital signal to a processor communicatively coupled with the circuitry, for further processing.

* * * * *